March 30, 1937.  H. L. PITMAN  2,075,540
COMBINED TYPEWRITING AND COMPUTING MACHINE
Filed Sept. 29, 1931   6 Sheets-Sheet 6
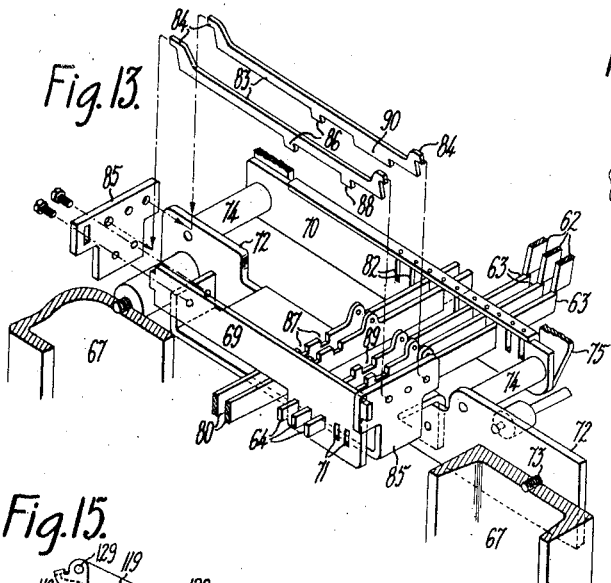
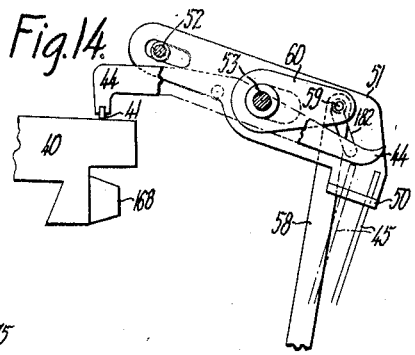
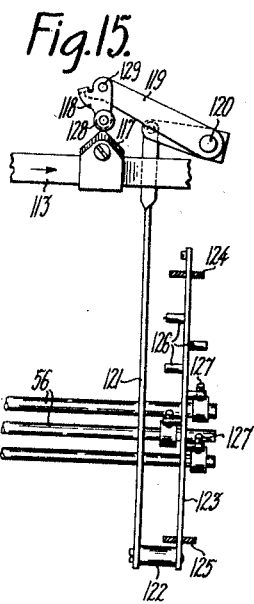
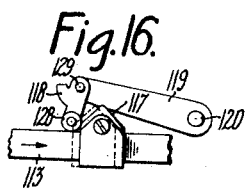
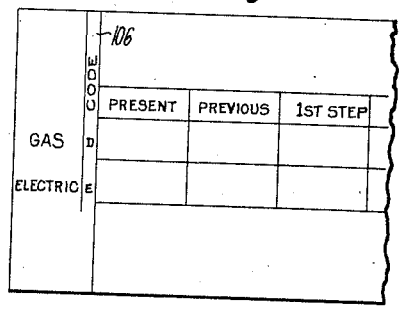
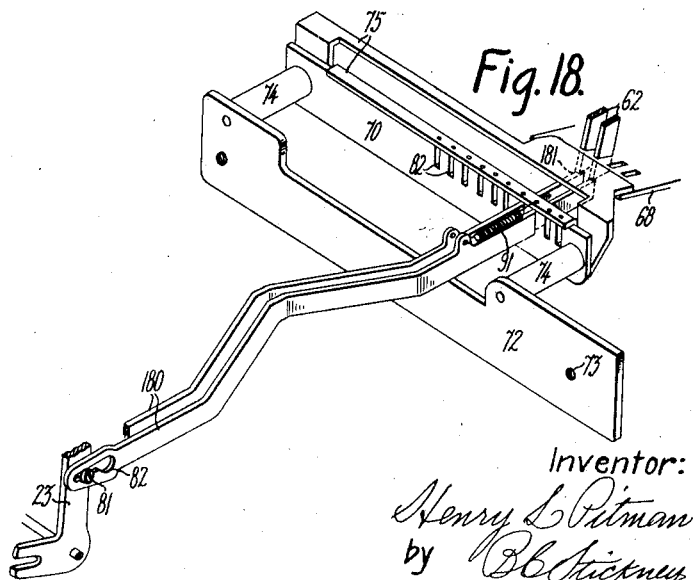
Inventor:
Henry L. Pitman
by　　Attorney Patented Mar. 30, 1937

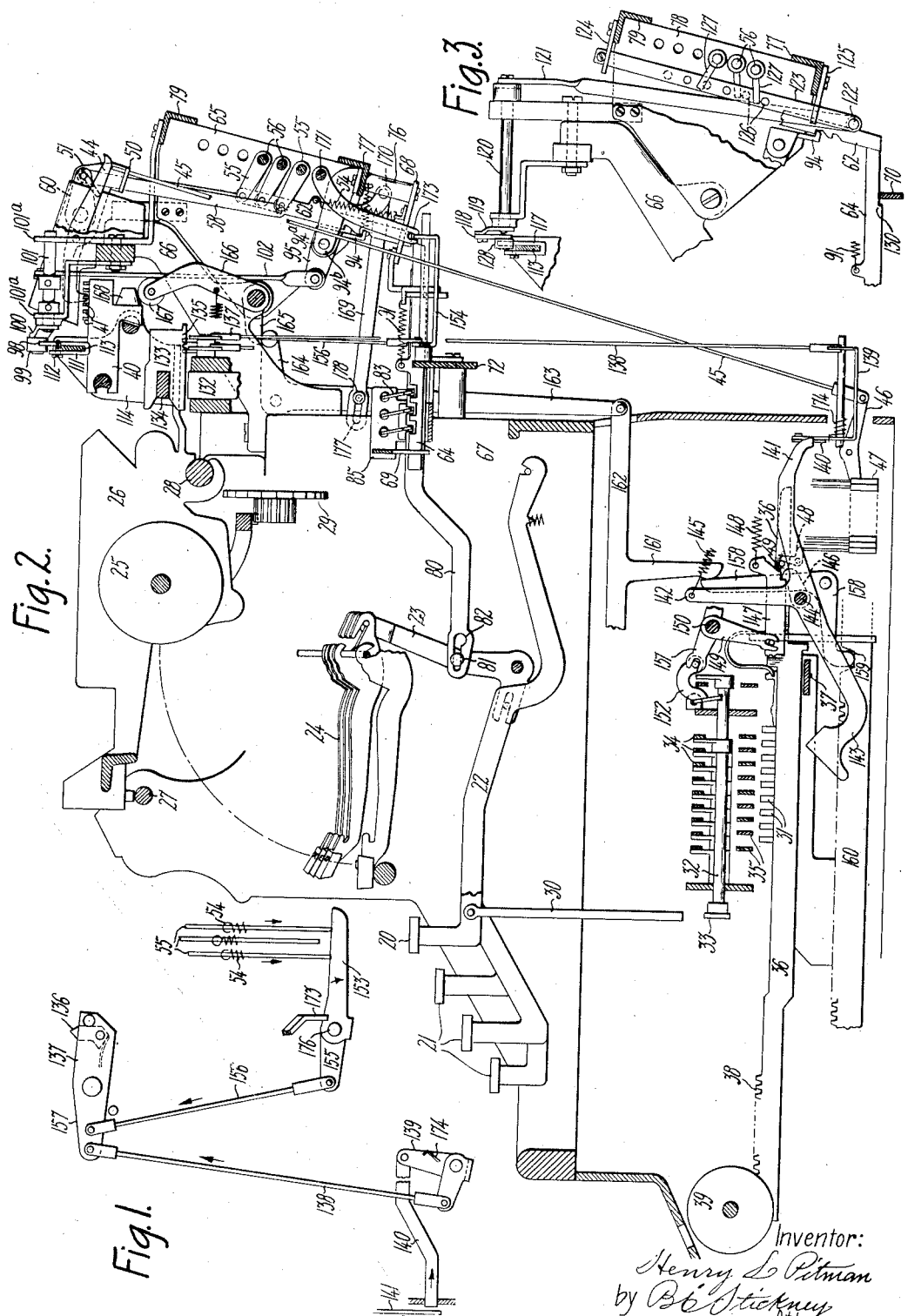

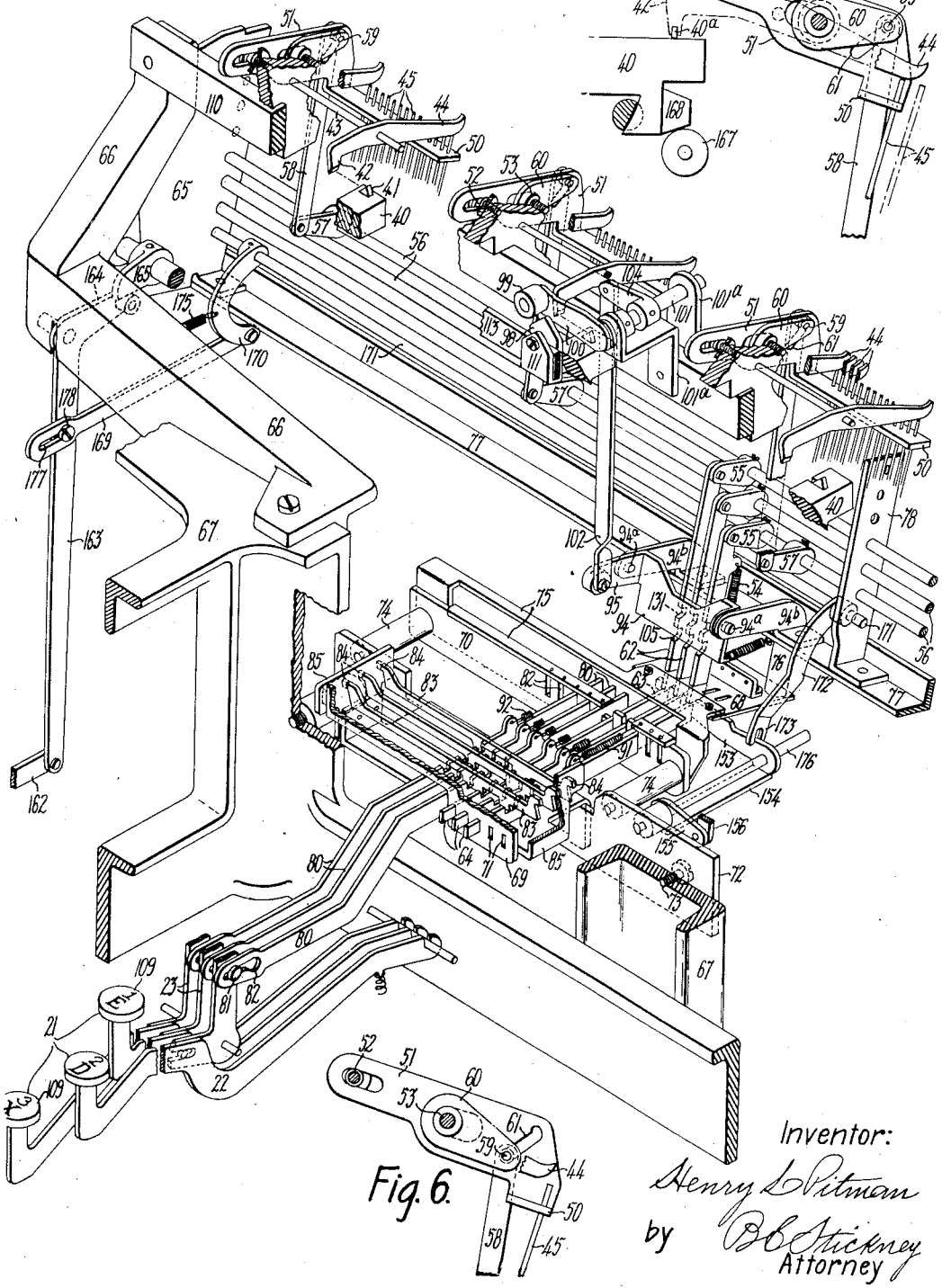

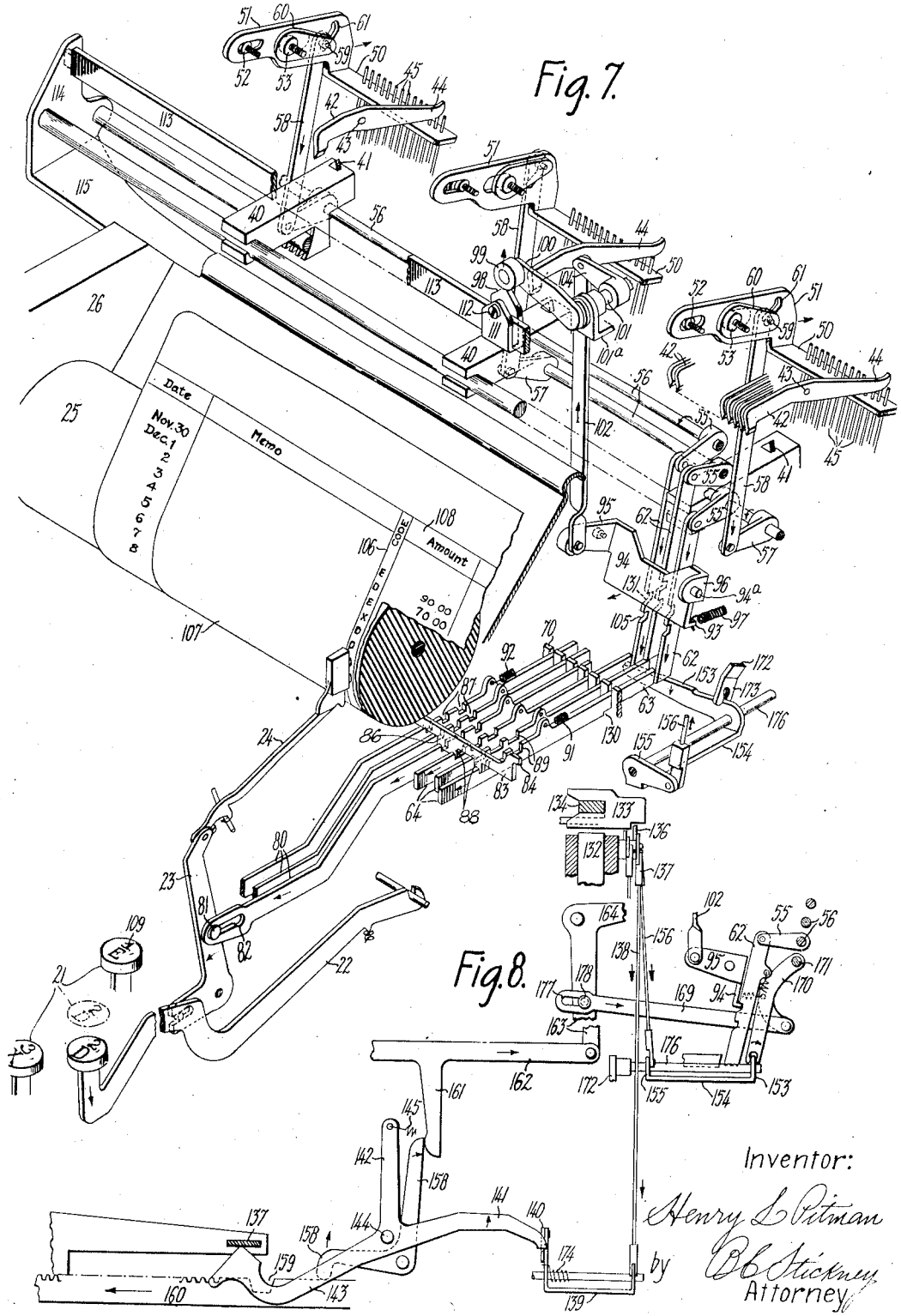

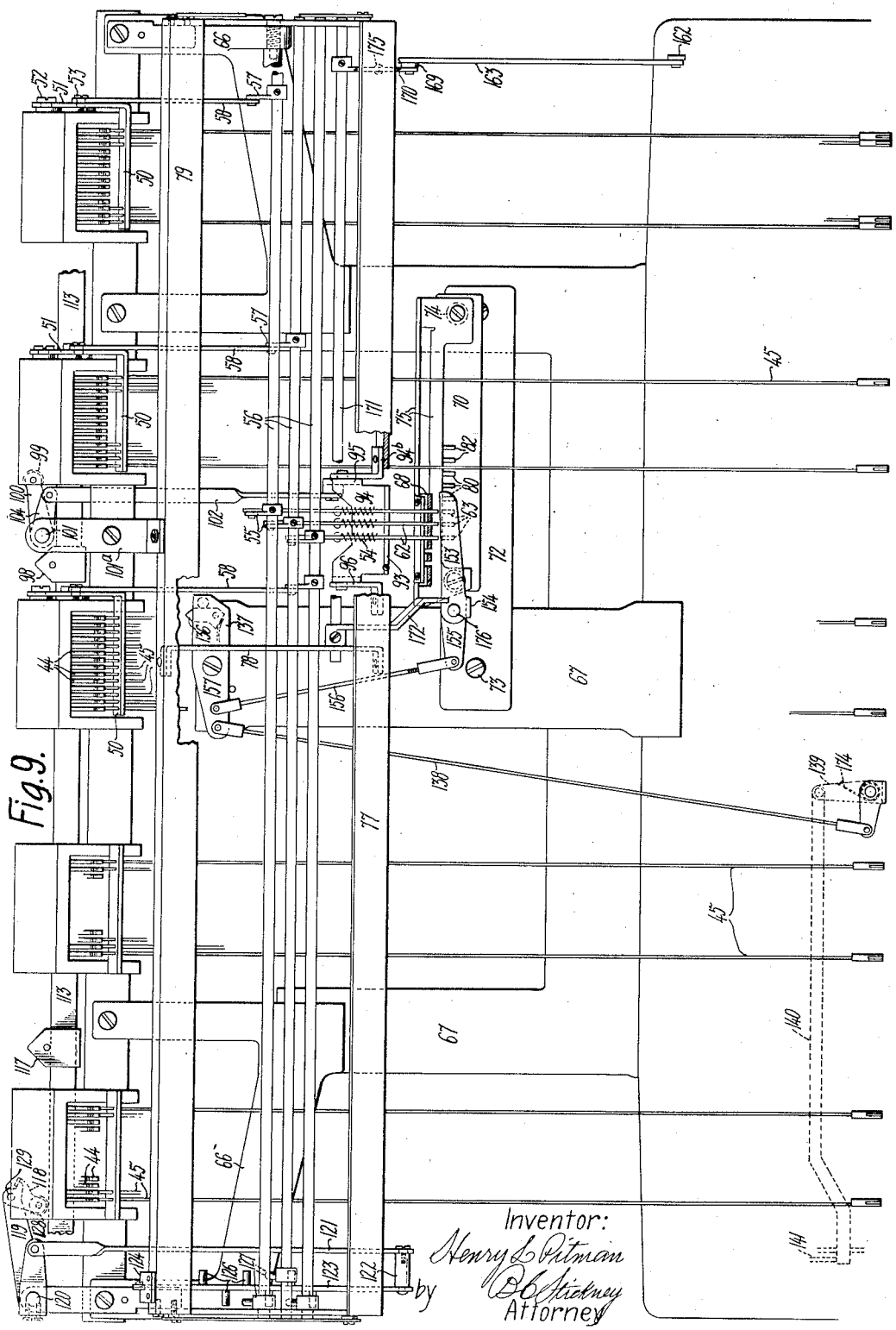

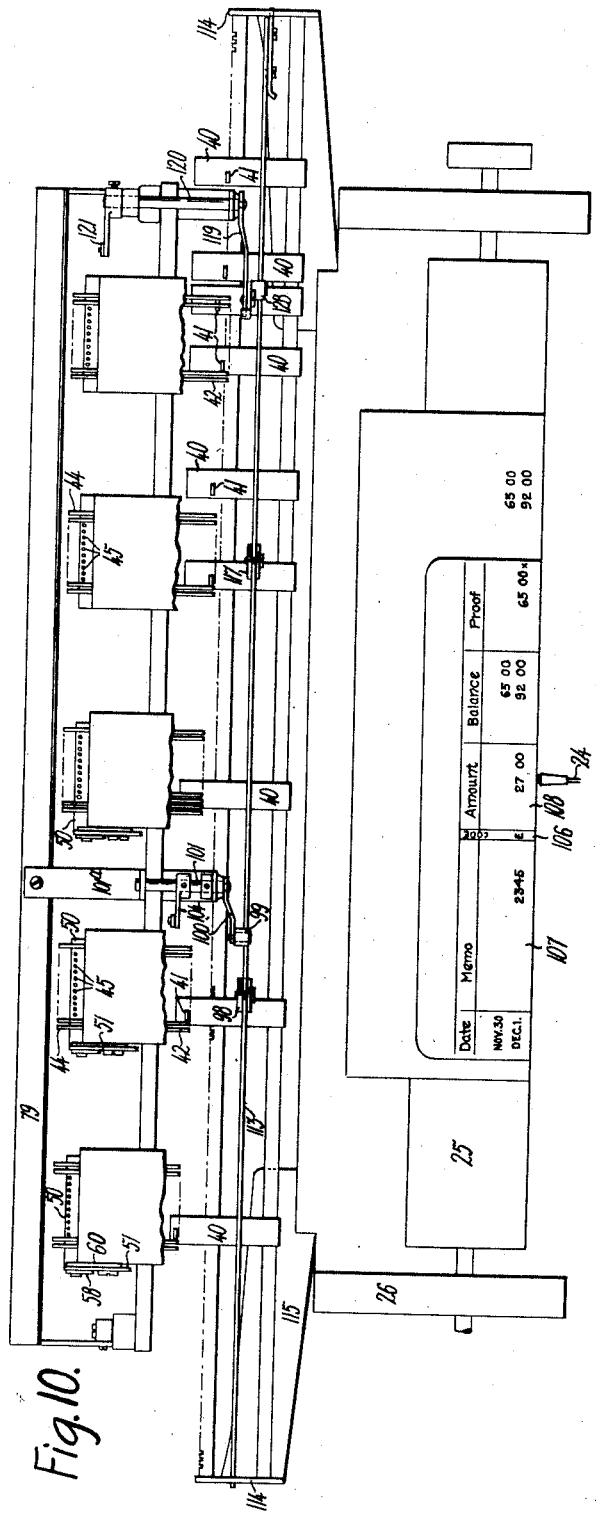

2,075,540

UNITED STATES PATENT OFFICE 2,075,540

COMBINED TYPEWRITING AND COMPUTING MACHINE

Henry L. Pitman, Westfield, N. J., assignor, by mesne assignments, to Underwood Elliott Fisher Company, New York, N. Y., a corporation of Delaware Application September 29, 1931, Serial No. 565,767

12 Claims. (Cl. 235—60)

This invention relates to combined typewriting and computing machines of the kind in which computation may be performed in many registers, and in which it is desired to employ type-keys for making different selections of registers in which to accumulate the amount or amounts that are typed upon the work-sheet.

There may be selectively employed as many as seven registers, although the number is not limited to seven; and each register may be either silenced or brought into use independently of all the remaining registers. Moreover, any two registers, or any three or more, may be selected by the type-key, and the printing of its type upon the work-sheet furnishes proof of the correctness of the selection of registers to receive the amount to be typed upon the sheet. In other words, any proof-type key may select any one or any grouping of registers.

A feature of the invention is that the scope of the register-grouping operation is much enlarged, and there may be employed many proof-type keys, one for each grouping. An individual proof-type key may be used for selecting any of the seven registers.

An example of the many uses of the invention, is that it is rendered practicable to list many miscellaneous and perhaps unrelated amounts one under another in a common column, which, according to old practice, would have had to be typed in separate columns. The amounts listed in this column are distributed into different registers, or different groups of registers. Hence a single column is made to suffice, for listing amounts which, according to the old practice, would have occupied many separate columns. Wide work-sheets may accordingly be replaced by neat narrow sheets, effecting economy in the cost of forms, and also in the cost of binders, and also in the filing space required. The smaller work-sheets may be handled more rapidly, thus increasing the output of the machine. These advantages are gained whether the blanking appurtenance (hereinafter described) has been stripped from the machine or not.

The space for types is extremely limited, and one of the features of the invention is to use a blanking appurtenance and thereby avoid the necessity of adding seven or other number of types and of proof-type keys to the keyboard; and through this blanking appurtenance it is contrived to employ alphabet-keys selected from the regular keyboard, and adapt them to the purpose of printing proof-characters upon the work-sheet, such selection being preferably the usual type-keys Q, A, W, Z, E, and D, which form a compact group in the left-hand portion of the keyboard. By the use of the blanking appurtenance, type-keys perform only their usual typing functions, so that description or other data may be typed upon the work-sheet, without effecting the selection of a register.

To each of these selected alphabet-type trains is connected a register-selecting train. By the use of the blanking appurtenance the keys may be prevented from functioning as register-selectors, except at one predetermined point in the travel of the carriage. At all other points the blanked keys may be operated freely, without selecting any registers. This register-selecting point in the carriage-travel may be located just ahead of the first column of amounts, that is, just before the first computing zone.

With the aid of the blanking appurtenance the alphabet-keys are operated freely in typing descriptions, items and other data in an appropriate column at the left side of the work-sheet, and then the carriage is advanced to the register-selecting point, whereupon the selected alphabet-key is depressed to print a proof-type, and simultaneously to make corresponding selection of registers. Thereupon the amount is typed in the adjacent column and run into all of the selected registers.

Another example of a field for the use of the invention, either with or without the blanking appurtenance, is found in accounting, where a combination of sheets is employed, related entries being made upon different sheets, and the amounts typed upon one or more sheets being computed in the registers in connection with amounts typed upon one or more other sheets. In this class of accounting, a selection is made of different groups of registers for each line of typing upon each sheet, and proof of correct selection is simultaneously typed upon the work-sheet in each instance.

Another example of a use of the invention, whether the same is stripped of the blanking appurtenance or not, is that bill-forms may be printed upon which to render bills for different kinds of supplies furnished. Certain registers may be reserved for billing one kind of supply, and other registers may be reserved for billing another kind of supply. Hence identical bill-forms may be used for both kinds of work, and when making out each bill the proof-character may be typed at the proper point, to prove the correct selection of registers for billing that kind of supply. The invention may also be applied to many other uses.

The silencing of each register is illustrated as preferably effected by disconnecting the denominational trains that run from the typewriter-carriage down to the pin-selecting devices of the usual indexing mechanism. The drawings show, in one form of the invention, that the registers are normally in operative condition, and that the operation of the proof-type key silences all registers except the one or more that are wanted. In another form of the invention, the registers all are normally disconnected, and the proof-type key connects up one or more registers to be used.

The denomination-rods for each register are guided in a movable rack, and a spring tends to shift said rack away from normal position, preferably. A pawl is used to restrain the rack. Any one or more of the selected type-keys may withdraw a trigger that releases the pawl and permits the spring to shift the rack and its rods.

Rock-shafts form a group extending across the machine adjacent to the groups of denomination-rods, and the rock-shafts are connected respectively to the racks that shift the denomination-rods. Each rock-shaft also has an operating arm controlled by its pawl, trigger and spring mechanism, these operating arms being grouped and forming members of trains whose alphabet-type keys are grouped together at the typewriter-keyboard.

If the blanking appurtenance is stripped from the machine, each proof-type key at each operation at any point in the line of typing withdraws its trigger, and permits the spring-tensioned denomination-rod-shifting mechanism to operate; but if the blanking appurtenance has not been stripped off, then no such operation occurs, except at a single point in the line of typing, because at all other points in the line said trains are restrained by means of the novel blanking appurtenance. While said trains are latched by the latter, the individual withdrawal of any trigger is merely an idle movement, and the trigger resumes normal position with the return of the key. At the designated point in the line of typing, however, said blanking appurtenance or universal latch is released, and hence the withdrawal of any trigger effects the shifting of the train that controls the associated set of denomination-rods.

The register-selecting trains are restorable to normal positions by the carriage, as the latter is returned to begin a new line of typing. All register-selecting mechanism may be returned to normal position in this way.

For some kinds of work the machine may be equipped with means to permit the proof-type register-selecting keys to shift the machine from normal additive condition to condition for subtraction.

Other features and advantages will hereinafter appear.

In the accompanying drawings,

Figure 1 is a rear elevation illustrating one means for shifting the machine to subtraction in connection with the operation of the register-selecting proof-type key.

Figure 2 is a sectional elevation, from front to rear, taken about centrally, of an Underwood combined typewriting and computing or bookkeeping machine. An entire system of alphabetical and numeral type-bars is represented at Figure 2.

Figure 3 is a sectional side elevation, showing the mechanism which is brought into action at the return run of the paper-carriage, for restoring to normal positions to register-controlling trains.

Figure 4 is a sectional front perspective, showing the proof-type keys and trains operated thereby and controlling the selection of registers.

Figure 5 is a sectional side elevation of the device for casting off the denomination-rods that form part of the carriage-control denomination-selecting trains.

Figure 6 is similar to Figure 5, but shows the register-rods cast off.

Figure 7 is a part-sectional perspective of the proof-type trains and the register-selecting devices operated thereby, also the carriage-control device which renders the proof-type keys effective at a certain point in the carriage-travel, at which point the key may be depressed for the code-column, and also means for selecting a register or group of registers. In full lines, this view shows the parts in operated position.

Figure 8 is a sectional side elevation, showing the mechanism which is common in said Underwood machine in connection with the shifting of the machine to subtraction, and also showing the subtraction-setting means which is brought into use by the proof-type key of the present invention. Parts shown in this view may be operated at every cycling.

Figure 9 is a rear part-sectional view of the Underwood bookkeeping machine provided with the present improvements, showing the parts in normal positions.

Figure 10 is a plan of the carriage and groups of denomination-selecting trains, and carriage-dogs which operate the same. This figure also shows the platen and one kind of work-sheet thereon.

Figure 11 is a view, showing an arrangement whereby one of the proof-type keys may be operated without shifting the machine from its normal additive state to condition for subtraction.

Figure 12 is a similar view, showing another proof-type train, capable of shifting the machine to subtraction.

Figure 13 is a sectional perspective view of the register-selecting frame and parts mounted therein, the cross-bails and other parts being separated.

Figure 14 is a view of a modified arrangement whereby the registers are normally all cast off, but, upon depression of the proof-type key, a register or group of registers may be brought into effective condition.

Figure 15 is a front elevation of means whereby the returning carriage restores to normal positions the register-selecting trains.

Figure 16 shows the position of parts of Figure 15 when the carriage is at its extreme returned position.

Figures 17 and 18 illustrate means whereby a combined gas and electric consumption bill may be made out upon the machine which may have one set of registers brought into action for gas-consumption, and another set of registers for electric-consumption; Figure 17 showing the bill and Figure 18 being a perspective to show the connection from the proof-type keys to the register-selecting trains.

*Standard Underwood mechanism.*—The drawings show a modified Underwood bookkeeping machine of the general type disclosed in the patent to Hart 1,190,171 of July 4, 1916. In said Underwood machine numeral-keys 20 and alphabet-keys (some of which are seen at 21) depress levers 22 to vibrate bell-cranks 23, to swing type-bars 24 upwardly to strike rearwardly against the platen 25. The platen is supported upon a carriage 26 running upon rails 27, 28, and is driven by the usual spring-barrel under the control of escapement-mechanism. The latter is represented at 29; the carriage feeding step by step at the operation of type-keys 20, 21.

In said Underwood machine, stems 30 depend from the numeral-key-levers 20, for the purpose of operating mechanism, whereby a numeral is indexed as it is being typed. Said indexing mechanism includes rows of settable index-pins 31, one row for each denomination. These index-pins are depressed selectively by the digit-keys 20, a key being depressed in each denomination as the typewriter-carriage feeds along. The stem 30 operates a rock-shaft 32 by means of an arm 33, and each rock-shaft operates a linkage which includes upper and lower cross-links 34 and 35. There is one cross-link 35 for every digit-key. When any cross-link 35 is depressed, it carries down such pin 31 as at the moment underlies the same, and thereby causes the pin to be projected below the pin-bar 36. In the ensuing cycling operation, the depressed pins are caught by a forwardly advancing general-operator bar 37, which, by means of the depressed pins, drives forwardly their associated pin-bars 36, and causes racks 38 thereon to rotate dial-wheels 39 accordingly. Each group of dial-wheels forms a totalizer or register. At the completion of the cycling, the pin-bars 36 return to normal positions, and the displaced indexing pins 31 are restored.

It will be noted at Figure 2 that index-pins 31 are normally not in register with the cross-links 35 by which the pins are to be selectively depressed. As usual in said Underwood machines, the index-pin-bars 36 are one by one advanced, so as to bring the pins on that bar into registration with the cross-links 35. This advance of the pin-bars 36 is controlled by the carriage 26 of the typewriter.

Said Underwood carriage usually carries a succession of adjustable dogs 40, each having a tappet or tappets 41 to engage and lift jacks 42, pivoted at 43. There is one jack for every denomination. Every register has one group of jacks. The jacks are arranged in a row to form a group, there being as many jacks in the group as there are dials 39 in the register. The function of the jacks is to determine which dial of the register is to be affected, or, in other words, which pin-bar 36 is to be advanced by the typewriter-carriage. For this purpose, the jacks have the form of levers, whose rearwardly-extending arms 44 depress denomination-rods 45 that extend from top to bottom of the machine at the rear thereof. The movement of each jack is transmitted by the downward thrust of its rod 45 to a lever 46, which controls the pin-bar 36 of that denomination. There is provided a group or row of levers 46 which actuates a denomination-transposing mechanism 47, in such a manner that a bell-crank 48 is rocked that corresponds with the selected jack 42. Said selected bell-crank drives forwardly the rear portion of its pin-bar 36 by means of a projection 49 thereon. This advance is just sufficient to advance the pins 31 to working positions beneath the cross-links 35, so that any pin may be depressed by selecting the proper numeral-type key 20, which also causes the numeral-type to print and the carriage 26 to feed, and thereby enables the dog 40 to lift the succeeding jack 42 and advance the next pin-bar 36. As so far described, the mechanism is standard in Underwood machines.

In practicing the present invention, several registers are employed, each having its own group of jacks 42, and its own system of connections 45, 46, etc., to its own group of pin-bars 36 that drive the dials of the register. This is more fully set forth in said Hart patent, although the invention is not limited to the use of the three registers which are depicted in said patent.

*Register silencing.*—For the purposes of this invention, it is not necessary to use the registers seriatim, nor to employ them one at a time, but the general aim of the invention is to provide dependable means for selecting one or more registers to be brought into use for registering each amount that is typed upon the work-sheet. The register-operating trains may all stand normally in effective condition; but, for carrying out the present invention in one form, provision is made whereby one or more registers may be silenced selectively. The silencing is effected preferably by disconnecting the jack-operated trains. This disconnection may be effected by swinging the upper ends of the thrust-rods 45 back out of the range of the jacks, so that when the jacks are operated seriatim by the carriage, their movements fail to be transmitted to their associated pin-bars 36, and hence the number which is being typed will not be indexed for such disconnected or silenced register. It may be explained here that the upper ends of the pin-bars work in perforations in a guide yoke or rack 50, there being one guide-rack for each set of rods; and this guide-rack may slide rearwardly to carry the upper ends of the rods 45 away from the jack-arms 44. The guide-rack 50 for each set of rods 45 is in the form of a horizontal perforated plate, which is bent laterally from a slide or arm 51, which is mounted to slide forwardly and rearwardly upon fixed pins 52, 53, Figures 5, 6. Each guide-rack is independent of the other guide-racks, thus permitting selective disabling of any one or any plurality of groups of denomination-rods 45.

The carriage-dogs 40 carry tappets 41 that occupy different positions in a direction transverse to the travel of the carriage, and the jack-arms have assorted lengths, one group of arms being of a length to engage a tappet 41, and another group of arms having greater length, to engage another tappet 41 upon another dog. Hence a tappet 41 can engage only the dog that it is intended for, as well known in this art. This gives a great range of selection. In some cases, there may be more than one tappet on the same dog, so as to enable that dog to have control over a number of selected registers.

There are shown five of the registers, and five groups of denomination-trains, one group for each register. All of the groups may normally be in effective position for operation of all the registers, and therefore normally any number typed upon the work-sheet would be run into all of the registers, providing that the carriage-dogs 40 were properly set up.

It should be explained at this point that each guide-rack 50 for the denominational rods 45 is connected to a spring, which tends to slide the rack back and to carry the rods away from the jacks; but that the racks normally are latched against the tension of the springs. The manner of selecting any register therefore is to unlatch all registers except the selected one, so that their springs may carry the guide-racks and rods back to silenced positions. It will be shown later that when the machine is cycled, said guide-racks are all returned automatically to normal positions, retensioning the springs and relatching the guide-racks.

The springs referred to are numbered 54, Figures 2, 4, and 9. These are shown in the form of tension-springs which pull down on arms 55, one arm for each yoke 50. These arms are mounted upon horizontal rock-shafts 56, which can therefore be rocked by the springs. Each rock-shaft is provided with an arm 57, from which extends upwardly a link 58, directly actuating the slide-bar 51, which carries the yoke or guide-rack 50. This link is pivoted upon a wrist 59 carried by an arm 60 pivoted at 53. The wrist works in a cam-slot 61 formed in slide-bar 51, so that when the link 58 is pulled down by the spring 54, the wrist 59 works against the cam, to cam the slide-bar 51 rearwardly, together with the guide-rack 50, and carry the denominational thrust-rods 45 back from the full-line to the dotted-line position at Figure 5.

*Register-controlling trains and latches.*—The springs 54 may be connected directly to the arms, but preferably are attached to pawls 62 which normally rest upon triggers 63. These triggers 63 are formed as the tips of slides 64, one for each pawl 62, so that there preferably may be as many triggers as there are selectible registers. It will be perceived that when a slide 64 is pulled forwardly, its trigger 63 will be withdrawn, and the pawl 62 will be thereby left unsupported, and the spring 54 will pull down the arm 55 and rock the shaft 56, and the link 58 will shift the slide-bar 51, with its guide-rack 50, backwardly, to carry the rods 45 to silenced positions.

The register selecting rock-shafts 56 extend horizontally across the machine at its rear, and are journaled at their ends in vertical racks 65 at the sides of the machine; said racks mounted on brackets 66 erected upon the rear portion of the typewriter-frame 67. The arms 55 are at different elevations, and the pawls 62 are made accordingly of graduated lengths.

Said pawls 62 are guided at their lower ends in slots provided in a horizontal guide-plate 68, which projects from the rear of a register-selecting frame, which includes front and rear vertical plates or walls 69, 70, having guide-slots 71 for the trigger-slides 64, see Figure 4. The register-selecting frame includes a main cross-plate 72, fastened by screws 73 to the typewriter-frame 67; and studs 74 extend rearwardly from the main cross-plate 72 to carry the rear guide-plate 70; the latter having a yoke-portion 75 to which is attached the guide-plate 68 for the vertical pawls 62. The latter is also supported by studs 76 that depend from the bottom of a transverse horizontal angle-bar 77. This angle-bar connects the side racks 65. A central vertical rack 78 is also provided to serve as a midway support for the register-selecting rock-shafts 56, this rack 78 rising from the lower tie-rod 77. The upper of the transverse tie-rods is designated as 79, Figure 9.

*Register selecting and proving trains.*—In the described register-selecting frame is mounted mechanism for enabling keys at the front of the machine each to make a selection of registers; any selection made by each key being independent of selections made by the other keys.

Since it is a valuable feature of the invention that a proof-type is printed upon the work-sheet concomitantly with the selection of one register or of a group of registers, several alphabet-type-keys 21 are employed. These particular keys therefore are made to serve as members of proof-type-printing and register-selecting trains, as will be explained. The bell-cranks 23 that are operated by these register-selecting type-keys are connected to rearwardly-extending links 80 by pin-and-slot connections at 81, the slot being of key-hole form, for ready attachment and detachment. At their rear ends these links 80 slide in guide-slots 82 formed in plate 70 of the register-selecting frame.

The links 80 transmit movement selectively to the trigger-slides 64, by means of rock-shafts 83, which are in the form of bails that extend across the slides 64 and are pivoted by means of ears 84 in end plates 85 of the register-selecting frame. Each key-train has its individual rock shaft or bail 83, so that the depression of each key serves not only to print a proof-type, but also to rock its bail 83, and thereby operate one or more of the trigger-slides 64 selectively, to withdraw the same from the pawl or pawls 62.

The pawls from which the triggers are withdrawn drop to register-silencing positions, so that the register or registers that are actually chosen for use are preferably those whose denominational trains are left undisturbed at the operation of the selecting key 21. In other words, each key determines which registers are to be silenced, thus leaving the remaining registers in effective condition.

Each rock-shaft or cross-bail 83 has a downwardly-jutting tooth 86, Figures 4, 13, to work in the notch 87 in one of the links 80. That part of the cross-bail which overlies the trigger-slides 64 is provided with a tooth or teeth 88, to work in a notch 89 in the trigger-slide 64. This tooth may be broadened as at 90, Figure 13, so as to operate two trigger-slides 64. It will be evident that the tooth may be formed on a cross-bail to operate every other trigger-slide 64, as seen at Figure 7, in which 86 and 88 are joined. It will thus be seen that the machine may be equipped with any desired selection of cross-bails, and that every time that a bail is operated by its key, the same proof-type will be printed upon the work-sheet, and said type will prove that a certain register or a certain combination of registers was brought into use by the operation of said key, and that the amount thereupon typed upon the work-sheet was run into said selected register, or said selected combination of registers. Each cross-bail 83 affords a different combination from the remaining bails. Hence three selections may be made of different combinations by using these three keys. The invention, however, is not limited to three bails, nor to three keys, since as many keys may be employed as desired, and the number of registers to use selectively may be increased or diminished.

The parts 64 may be duplicates. The parts 80 may also be duplicates. None of these parts 64 or 80 needs to have any different arrangement of notches from the others. The differential elements are the cross-bails 83, each of which is made especially for effecting a certain selection by means of a specially placed tooth or teeth therein.

It will be understood that when the trigger-slides 64 are pulled out from the pawls 62, the latter descend, and consequently lock the slides 64 against the tension of their returning springs 91. The links 80 are provided with similar returning springs 92, and of course these are also locked in their forward positions by the dropped pawls 62, at the same time with the trigger-slides 64, since each link 80 is connected to a slide 64 by a cross-bail 83. The pin-and-slot connection at 81 of the link 80 to the bell-crank 23, permits the link 80 to remain in its forward or set position, while the key, bell-crank and type-bar return to normal positions.

It will be observed that type-keys are used for typing on the work-sheet certain proof-characters, to establish what register or combination of registers will accumulate the amount that is thereupon typed. These proof-typed keys may if desired have no other purpose in the machine than to type these proof-marks; and in that case such proof-type keys would be supplemental to the regular keyboard, and the proof-types themselves would be supplemental to the regular type-system.

*Use of regular alphabetical keyboard for register selection and proof printing.*—It is one of the objects to avoid increasing the already over-crowded type-system in the typewriter, and also to avoid increasing the number of keys to the already over-crowded keyboard in the typewriter. It is therefore a feature of this invention to employ for proof purposes certain of the alphabetical keys and types of the regular system, thus avoiding the necessity of augmenting either the keyboard or the type-system. To this end, as will be understood from the foregoing description, said alphabetical type-key trains are connected by the trains 80, 83, and 64 to control the selection of the registers.

In contriving for the selected alphabetical keys and types to give such further service, the difficulty is encountered that the usual keys are ordinarily operable at any point along the line of writing, and therefore would of course call into action some part of the register-selecting train, regardless of the position of the carriage. This difficulty, which might forbid the adoption of the regular keyboard for register-selecting and proving purposes, is overcome by means of blanking appurtenance 94 of the present invention, by preventing register-selection under the control of certain alphabet-type-keys, except at a point that is determined by the typewriter-carriage, at which point there can be co-operation between said register-selecting keys and said carriage. In order to permit the selection of the register while said keys are typing their characters upon the work-sheet, there is provided a blanking appurtenance in the form of a carriage-controllable universal latch, which normally prevents the pawls 62 from falling when their triggers 63 are withdrawn, thereby depriving the keys of their ordinary register-selecting function. This latch may be in the form of a flange 93 formed upon the lower end of the cross-bar 94 of a bail. The bail includes arms 95, 96, normally held by a spring 97 in effective position. Said latching plate 94 is pivoted at 94ᵃ upon brackets 94ᵇ. If the pawls 62 were one or all released by dislodging triggers 63, said blanking appurtenance 93 would still latch or restrain the pawls 62 from dropping, and hence no registers would ever be selected; but at this point there is co-operation of the carriage whereby the blanking appurtenance 94 is released for controlling the register-selection jointly with the latches 63. The effect is that at one point in the carriage travel, a register-selection may take place, and the proof-character may be typed. It will be perceived that upon the carriage is provided a cam 98, which for nearly the entire line is idle; but at one point in the line it reaches a roll 99, and elevates the same, together with an arm 100, and rocks a shaft 101, which is connected by a down-reaching link 102 to the bail-arm 95. Thus the carriage, by elevating arm 100, raises arm 104 and link 102, and swings the universal blanking appurtenance or latch 93 to a pawl-releasing position, or in other words renders the blanking appurtenance temporarily ineffective. Thus at this particular point in the travel of the carriage, any of the keys at Figure 7 may be operated to effect register-selection, since the carriage-effected withdrawal of the blanking appurtenance 93, 94 permits any pawls 62 to drop whenever a latch-slide 64 is pulled forwardly by a key 21 at Figure 7.

It will be seen that the universal latch 93 is withdrawable from the lower notches 105 which they normally occupy in the pawls 62. The cam 98 is placed on the carriage at a point just at the left of the amount-columns on the work-sheet, so that the proof-characters will be printed in the narrow column 106 that is designated as "Code".

The use of the blanking device for a few of the alphabet-types for proof-typing purposes, does not diminish the usefulness of the register-selecting keys for ordinary alphabetical purposes in accounting work, because the proving function of the types is effected at a point just at the left of the main columns, thus leaving practically a full-width column 107 for description or memoranda. In this column any matter may be typed with the alphabet-types in the usual manner. In other words, the blanking appurtenance enables the register-selecting alphabetical keys to be used for regular typewriter purposes in column 107, but certain desired keys thereof are also usable exclusively for proving a register-selection in the narrow column 106 at the right-hand border of 107.

The rock-shaft 101 may be supported in brackets 101ᵃ mounted upon a rail-portion 110 of the framing 66.

The cam 98 may be formed upon a clip 111, which is securable by a screw 112 at any point along a bar 113, which is fastened at its ends in side plates 114, that rise from a transverse bar 115 mounted upon the carriage at its ends.

It will be understood that, after the description has been typed in the column 107, by the aid of the blanking device, any one of the register-selecting keys 21 may effect a selection, and also type a proof-character in the column 106. Then the numeral-keys 20 are depressed to type the amount in the column 108, and at this time the index-pins 31 are set for every register that has just been selected by the key 21. All groups of denominational thrust-rods 45 are automatically disabled through the train 80, 83, 64, 62, and remain disabled during the typing of the amount; the pins 31 being indexed only for those registers whose denominational rods 45 remain in normal adjusted positions.

Then the usual cycling key is depressed and the general-operator bar 37 carries forward (by means of the depressed index-pins 31) the pin-bars 36 in all of the groups whose selection has been determined by the selected key 21, so that the number which is typed in column 108 is carried into the selected registers by means of the racks 38.

At the remaining portion of the cycling operation the cross-bar 37 returns to normal position, and, by means of lugs upon the pin-bars 36, returns the latter to normal positions.

*Examples of accounting.*—This invention is adapted for the purpose (among others) of typing miscellaneous amounts one under another in a single column, which are not to be added together, but which it has been the general practice to enter in individual columns. The objection of such old method is that it necessitates the use of very many columns, and very wide sheets, and wide typewriter-carriages. In practicing certain features of the present invention, these miscellaneous amounts may be typed one under another in a single column (which may be directly alongside of the proof-column), but these amounts are not footed vertically. They are run into different registers, one amount going into one register, and the next amount perhaps being run into three registers, and the next amount into two registers. The cross-bails 83 effect the selection of registers for accumulating each amount that is typed, and the key 21, which is connected to said cross-bail by the member 80, prints in the code-column 106 (Figure 7) a letter which identifies the bail 83, to prove which registers were selected by the key, to accumulate the number that is typed in the common column 108. Other columns 108 are provided, for cross-adding and other computation.

The keys 21 may be labeled with individual numbers as at 109, to aid the operator. The key E at Figure 7 is labeled with a 1, showing that it selects the 1st register; the key D selects the 2d register, and the key X selects the 3d register. As many keys of the keyboard may be used for different selections of one or more registers as may be required, for this condensed billing or accounting.

From the foregoing it will be seen that these amounts typed in a common column are properly distributed among selected registers, and that the selection of the registers is made by keys only when the carriage is at a certain point, and that at that point the keys type upon the work-sheet the proof that the proper selection of registers has been made, and at the same time effect such selection automatically.

It will be evident that these amounts typed in the common column may be run into selected registers, mounted side by side, the selection being made just prior to the typing of each amount. Cross-computation may also be performed, even though the amounts that are cross-computed are disposed in a vertical column. In a simple form of the machine there may be used, say seven registers, and six of them may be under the selective control of the proof-type keys, while the seventh may be a cross-computing register, and every amount that is entered in the common column, under the control of a register-selecting key, may be entered in the selected register, and also in the seventh register. Hence when the amounts are all entered in the various registers, the result of the cross-computation of all amounts will appear in the seventh register.

The machine is therefore capable of cross-adding amounts that are placed side by side in individual columns, and also of cross-adding amounts that are placed one under another in the same column and run into individual registers.

It will be perceived that when a selection of registers is made by the type-keys, it does not necessarily follow that the amount which is typed in the common column will be run into all of the selected registers. It should be kept in mind that the carriage is provided with various adjustable selector-dogs for operating the denominational jacks, and that in some cases only one dog may be adjusted for use when the amount is being typed, and hence that amount may be run into only one of the key-selected registers. Or it may be that two dogs are in use, for two of the key-selected registers, when said amount is being typed in the common column. Or, in some cases, three or more dogs may be in use simultaneously for accumulating in three or more registers the amount that is typed in said common column. There is, therefore, a joint selection of registers, one joint selector being a selecting key, and the other joint selector being one or more of the carriage-dogs.

As an example of another kind of accounting for which the invention is adapted, several accounting-sheets may be used in combination, each sheet having appropriate individual columns and captions. One of the sheets may form a master sheet, which may summarize the entries that are made upon the individual sheets in the set. The sheets may be placed in the machine and typed one at a time, and for each sheet the registers or groups may be selected by the keys 21, for as many lines of typing as may be required; a new register-selection being made for each typed line. Then this work-sheet may be withdrawn, and another sheet substituted, a new selection of registers made, and the amounts computed in the proper columns. The amounts that are entered on this second sheet may be combined with those that were entered upon the first sheet. Then the second sheet may be withdrawn and the third accounting-sheet of the set may be introduced and typed, and so on for a number of individual sheets. After the last sheet is withdrawn, a master sheet may be inserted, and the amounts that are exhibited in the various registers in the machine may be copied upon the master sheet, and new entries may be made and accounting performed thereon.

An accounting-sheet of this type is seen at Figure 10. Carbon-copies may be made of the individual sheets, as well as the master sheets; and entries may be copied from one or more thereof upon the right-hand margin of the carbon-copy sheet, as shown in Figure 10, and the copying of these amounts may be made to affect one or more registers.

When typing on the same line an amount in the second or third column, there may be brought into use any one or more of the registers that were originally selected by the key for that line of typing. How many of them are to be brought into use in any column, depends upon what dogs are adjusted therefor. For each of the columns there may be a different setting of adjustable dogs, if desired. The register-selecting key casts off certain registers, so that those cast-off registers are not brought into use on that line of typing, regardless of what carriage-dogs may be employed.

In preparing this machine for various kinds of work, the selection and adjustment of the carriage-dogs (having the tappets that operate the denominational jacks) is a matter of importance, that is within the skill of those trained in this art; and that a proper selection of register-selecting type-keys, and a proper selection and arrangement of the carriage-dogs, will furnish foundation for the performance of a large range of accounting upon the machine. The machine is usually made with a permanent equipment of two, three or more register-selecting cross-bails 83; but it will be seen that these are readily detachable, and that others may be substituted therefor, in preparing the machine for varieties of work.

For some work, each of the keys may select only one register, that is, it may cast off all registers except one. All registers that are controlled by any key, are preferably cast off; and whatever carriage-dogs 40 are employed, must co-operate with the remaining registers only. The machine may be provided with an assortment of dogs 40, each properly adjusted, and some of the dogs may co-operate with one or more registers in different computing zones. But these dogs, although traveling with the carriage, will never co-operate with any register that is cast off. Hence many of the adjusted dogs may travel idly. Some dogs will be idle in one line of typing, and some in another line. Moreover in each line of typing one or more carriage-dogs will be active in one adding zone and idle in another adding zone, and so on, depending upon which of the register-selecting keys was depressed at the outset of the computation in that line. It will be seen that the possibilities of adjustment and combination of dogs and registers cover a very wide range, for a very wide variety of accounting.

One of the valuable uses of the invention is in the field of double or triple cross-adding. Cross-computing may be performed of numbers typed in two columns and computed in two individual registers, and simultaneously run into a third register. The third register will show the result of the cross-computation. Such result may then be copied in a third column. This would occupy, say, a portion of the line of typing.

The remainder of the line may be devoted to typing amounts in two or three other individual columns, and running the typed amount into two or three other registers, and cross-adding the same by means of a separate register. The result may be copied from the fourth register into a fourth column. This gives two successive cross-additions in a single line of typing. Moreover, there may be in use still one more register, to effect cross-computation of all the amounts in the entire line. There may be a sufficient number of register-selecting keys to select certain registers for one cross-adding operation, and certain other registers for another cross-adding operation in the same line of typing, and an additional register for a grand cross-adding operation of the entire line. In the succeeding line, another key may be operated for governing some other kind of accounting, either with or without cross-adding. Another key may make still another selection of registers for still other kinds of computation.

*Restoration of register-selecting trains to normal positions.*—After the line of typing is completed, the paper-carriage is given a return stroke, to begin a new line of typing and accounting. The return of the carriage is usually effected either by power or manually. The return is utilized to restore the silenced register trains, and also the register-selecting mechanism that has been set by the proof-type-keys. For this purpose, there is mounted on the carriage a restoring cam 117. This may be mounted upon the same bar as the code-cam 98, and may be adjusted along the bar if desired. These restoring cams 117 may come into use when the carriage has nearly completed its return stroke. In the path of this cam is a part 118, that when struck lifts an arm 119 and rocks a shaft 120, and thereby raises a pendent link 121. The link is pivoted at its lower end to a stud 122 which projects from the bottom end of a vertical restoring slide 123, that is guided in upper and lower brackets 124 and 125, Figure 3. This slide is provided with opposite rows of restoring lifters 126. These project under arms 127, which are fastened upon the ends of the register-selecting rock-shafts 56; and all of these shafts may be rocked up to normal.

This may take place while the carriage is moving through a short distance, and in practice it is found not to cause a serious obstruction to the return of the carriage, since the arm 119 has a roll 128 that runs upon the beveled operative edge 117 of the cam. The part 118 is pivoted at 129 to arm 119, so that it will swing idly about said pivot whenever the carriage is advancing in letter-feeding direction, the member 117 being effective only during the return of the carriage.

When said rock-shafts 56 are rocked up, all of the depressed arms 55 thereon are swung up, together with the pawls 62 that are pivoted to said arms. These pawls, which have locked the trigger-slides 64 in their forward or tripping positions, are thus withdrawn, and the springs 91, 92 return these trigger-slides to normal positions, the triggers 63 sliding beneath the pawls 62, and the selecting bails 83 being rocked back to normal positions, together with the members 80. The slides 64 have stop-shoulders 130 that normally come to rest against guide-plate 70, Figure 3.

When any one or more of the pawls 62 are raised, the universal latch 93 is swung forwardly to pawl-releasing position. This release is effected by a lower cam-edge 131 formed in an upper notch upon each pawl. From its released position this latch 93 is snapped back into the lower notches 105 of all the pawls, as soon as the latter are raised by their arms 55. It will be understood that the latch 93 must retain its latching or normal position in all pawls 62 that have not been selected by a key. Hence said latch must occupy the lower notch in an idle pawl, while all the other pawls are down. Hence each pawl has both an upper notch and a lower notch. At Figure 7 this universal latch is seen as retaining the middle pawl in its upper position, while the side pawls are depressed. The raising of any pawl swings the universal latch out of the notches, and when all of the pawls are in their upper positions, they are relatched by the spring 97.

*Subtraction.*—Underwood bookkeeping machines are usually equipped with means for setting the computing mechanism to subtract. It is also usually provided with decimal-tabulating mechanism, including decimal-stops 132, and a succession of column-stops 133, the latter adjustable along a rack 134 on the carriage. These column-stops usually automatically set the machine for subtraction. To this end, the column-stop has a rear extension 135, which is effected (whether the carriage is to be tabulated or not) to shift the machine to subtraction at a predetermined point in the travel of the carriage. Several of the column-stops may be provided with this extension 135, so that the machine may be repeatedly shifted to subtraction during the typing of a single line. Every time that an amount is subtracted, the cycling mechanism restores the machine to condition for addition.

(See patent to Minton No. 1,280,065, of September 24, 1918.)

This extension 135 on any subtraction-setting column-stop is effective to engage the usual one-way cam 136 upon a lever 137, to depress said lever and thereby raise a link 138 to rock a bell-crank 139, from which extends horizontally a long latch 140. At its extreme end this latch normally supports an arm 141 of a lever, also having arms 142 and 143. When the latch 140 is withdrawn, as described, the arm 141 is swung down about pivot 144 by means of a spring 145. Fixed on the three-armed lever is a hook 146, which is thus withdrawn from a notch in a slide 147, permitting it to be pulled rearwardly by its spring 148, thereby vibrating arm 149, shaft 150 and arm 151. The latter operates a lever-contrivance 152, which shifts all the shafts 32 endwise forwardly, to put the machine into condition for subtraction by complementary addition in the usual manner. At the subsequent cycling operation, the cross-bar 37 of the general operator operates arm 143 to restore the parts to condition for addition. This subtraction-setting mechanism is well known in the Underwood bookkeeping machine.

Usually the miscellaneous amounts that are typed in the common column 108 are subtracted; but for certain classes of work it is desired that the first entry in this column be added. Hence the foregoing automatic subtraction-setting mechanism, under the control of the carriage, is not in some instances depended upon for setting the machine for subtraction in column 108. It is contrived that any one of the register-selecting type-keys may automatically set the machine for subtraction. This is done by providing an arm 153, that is depressible by any of the pawls 62, so that when any one or more registers are selected, said arm 153 is swung down, together with the remaining portions of a bail 154, 155, thereby lifting a link 156, which connects the bail-arm 155 to the driving arm 157 or the cam-lever 137, so that the machine is automatically set for subtraction when the register-selected type-key is depressed, even though there is no column-stop set at this point.

When it is desired to use a set of sheets, the amounts typed on one sheet having a relation to the amounts typed on other sheets, the register-selecting proof-type keys may be employed, and in each such instance the amount which is typed in the common column 108 will be subtracted automatically.

It is desired, after subtraction of a number that is typed in a common column 108, that the machine shall be returned to addition automatically; and for that reason it is no longer desired that the subtraction-setting function of the register-selecting keys shall be continued or prolonged, as it may not be desired to subtract in the remaining column or columns that may have been selected by the type-key. The novel subtraction-setting arm 153, which is controllable by the register-selecting key, is therefore arranged to be automatically silenced after an amount is typed in said column 108. For this purpose, there is brought into use a restoring mechanism which is auxiliary to the usual train of dog-disabling devices which operate at the cycling of the machine. This train of dog-disabling devices usually includes a bell-crank 158, which normally occupies a notch 159 in a part 160 of the general operator, so that as soon as the cycling begins, said bell-crank 158 is swung out of the notch 159, and its upstanding arm presses rearwardly a lug 161 upon link 162, thereby swinging arm 163 of the bell-crank, the other arm 164 of which lifts an arm 165 and swings rearwardly an upstanding arm 166 that carries a roll 167, normally supporting the dog 40; the dog having a roll 168 pressing upon conical roll 167, thereby pressing up the roll-frame. Roll 168 normally rests upon roll 167, and when the latter recedes, the selecting dog falls, and carries its tappets 41 out of range of the jacks, so that the indexing mechanism is silenced while the machine is cycling.

The indexing mechanism is, according to the present improvements, connected to a train which releases the aforesaid subtraction-arm 153 from the pawls 62. The train includes a link 169, Figure 4, which is connected by a pin-and-slot connection to the aforesaid arm 163, and is mounted at its rear end by an arm 170 upon a special transverse rock-shaft 171. Upon the other end of said rock-shaft is fixed a pendent arm 172, which at its lower end has an arm 173 to operate the subtraction-setting arm 153. The rocking of the pendent arm 170 rearwardly carries the arm 153 rearwardly out of range of the pawls 62, and the arm 153 may be returned to normal by the return spring 174, which is usually employed for returning the subtraction-setting train 137, 138, 139, etc.

The arm 153 will now occupy an abnormal position behind the pawls 62, and this position will persist until all of the pawls are raised through the operation of the carriage-cam 117, as already described. This raising of the pawls will release the arm 153, and permit it to be snapped forwardly under said pawls by means of a spring 175 which is attached to the arm 170. The bail 153, 154, 155 can slide endwise upon a fixed shaft 176 between its ineffective and effective positions. The link 169 has a slot 177, which carries a pin 178 on the supporting arm 163. This gives clearance for said arm 163 to swing forwardly when necessary, independently of the link 169 and the subtraction-arm 153.

It may be provided for one of the register-selecting type-keys to be operated without shifting the machine for subtraction, this arrangement being desirable for some kinds of accounting. The arm 153 may be provided with a notch 179 opposite any of the pawls 62 shown, and it will not operate the member 153 when the proof-type key is depressed to select a group of registers. But when one of the other keys is operated for selecting any group of registers, it will set the machine for subtraction, as already explained.

*Gas and electricity bills.*—One method of billing that can be carried out by the present invention is illustrated at Figures 17 and 18. Figure 17 is a bill-form usable for charging consumption of either gas or electricity. Figure 18 shows a simplified connection controlled by the register-selecting proof-type keys. Each of the links that runs back from the bell-cranks 23 of the type-actions (which in this view are designated as 180), is provided at its rear end with a trigger portion 181 to cock the register-selecting train 62, thus dispensing with the cross-connecting bail 83. Each of the shafts 56 which is operated by the pawls 62 may be provided with a series of arms 57, for selecting a certain group of registers. This simple arrangement can be employed for simple bills. When one key is depressed to type in the proof-sign column 106 for making out a gas bill, the character that is typed in said column designates those registers which are connected by said arms 57 to the single rock-shaft 56, which is controlled by the single key through a link 180. When an electric bill is to be made out, the other key is typed in the proof-sign column, and operates another one of the rock-shafts 56, together with its arms 57, controlling a different group of registers. Hence the bill blanks may be printed cheaply in quantities, and any bill may be used for the consumption of gas or the consumption of electricity, the typing of each bill requiring only a single line. Alphabetical types need not be employed in typing words on these bills, for the typed data consist ordinarily of amounts. Figure 18 is therefore shown stripped of the blanking appurtenance 94.

*Registers may be normally silenced.*—In the foregoing description the registers are normally in effective positions, and the proof-type keys determine what registers to cast off. However, all of the registers may normally be cast off, and each proof-type key may be connected to bring into use any selected register or any selected group of registers. The denomination-rods 45 are shown in full lines at Figure 14 normally cast off. Whenever any link 58 is thrust down by a proof-type key, it works down in a cam-slot 182, which is inclined oppositely from the cam 61 already described; and by pulling down the arm 60, it causes the slide 51 to move forwardly together with the rack 50, thereby swinging all of the denomination-rods 45 forwardly to the effective dotted-line position at Figure 14. This form of the invention can be applied to all classes of work wherein it is not desired to have the registers normally in effective condition.

Certain of the features of the invention that are employable without other features are made the subject of divisional application No. 15,967, filed April 12, 1935. The present application pertains to the specific dead-point feature, including the settable carriage-cam mechanism 98 and roll 99, for shifting the location of the point where alphabetical types may render special service in the manner indicated. The divisional application pertains to general construction which is serviceable whether or not said cam and roll mechanism 98, 99, etc., is embodied in the machine.

Variations may be resorted to within the scope of the invention, and portions of the improvements may be used without others.

Having thus described my invention, I claim:

1. In a combined typewriting and computing machine, the combination with a carriage, numeral-type-keys, indexing mechanism operated thereby, and a set of registers, of a system of alphabet-type-keys, and register-selecting means operable selectively by certain of said alphabet-type-keys, said carriage having means for cooperation with said certain alphabet-keys to effect a register-selection at only one point in the travel of the carriage.

2. In a combined typewriting and computing machine, the combination with a carriage, numeral-type-keys, indexing mechanism operated thereby, a set of registers, and groups of denomination-rods effecting communication between the carriage and the indexing mechanism, of guide-racks for the denomination-rods, springs tending to shift said racks away from normal positions, pawls to restrain the racks, triggers intercepting the pawls, and proof-type keys connected to withdraw the triggers selectively and permit the springs to shift the racks and rods, said keys forming a portion of a standard alphabetical keyboard, and said carriage having means to cooperate with said keys to effect register-selection only at a predetermined point in the travel of the carriage.

3. In a combined typewriting and computing machine, the combination of a carriage, numeral-type-keys, indexing mechanism operated thereby, a set of registers having controllers, springs tending to shift said controllers, pawls to restrain the controllers from being shifted by the springs, triggers intercepting said pawls, register-selecting keys having means to withdraw said triggers to permit the springs to shift the register-controllers, a universal latch for restraining said pawls when released by said triggers, and means controlled by the carriage for releasing said universal latch at a predetermined point in the carriage-travel but restraining said pawls at other points in the carriage-travel.

4. In a combined typewriting and computing machine, the combination with a carriage, numeral-type-keys, indexing mechanism operated thereby, and a set of registers, of a group of type-keys forming members of a standard alphabetical system, register-selecting trains operable by said keys selectively, and means adjustable along said carriage to render said register-selecting trains effective at a predetermined point in the travel of the carriage.

5. In a combined typewriting and computing machine, the combination of a carriage, numeral-type-keys, indexing mechanism operated thereby, a set of registers having controllers, springs tending to shift said controllers, pawls to restrain the controllers from being shifted by the springs, triggers intercepting said pawls, register-selecting keys having means to withdraw said triggers to permit the springs to shift the register-controllers, a supplemental latch being provided to restrain said pawls when they are released from said triggers, and means controlled by said carriage to withdraw said supplemental latch at a predetermined point in the travel of the carriage, at which point the selection of the registers by the keys may be effected.

6. In a combined typewriting and computing machine, the combination of a carriage, numeral-type-keys, indexing mechanism operated thereby, a set of registers having controllers, springs tending to shift said controllers, pawls to restrain the controllers from being shifted by the springs, triggers intercepting said pawls, register-selecting keys having means to withdraw said triggers to permit the springs to shift the register-controllers, a supplemental latch being provided to restrain said pawls when they are released from said triggers, means controlled by said carriage to withdraw said supplemental latch at a predetermined point in the travel of the carriage, said supplemental latch being in the form of a pivoted bail, and a spring normally holding it in effective position.

7. In a combined typewriting and computing machine, the combination of a carriage, numeral-type-keys, indexing mechanism operated thereby, a set of registers having controllers, springs tending to shift said controllers, pawls to restrain the controllers from being shifted by the springs, triggers intercepting said pawls, register-selecting keys having means to withdraw said triggers to permit the springs to shift the register-controllers, a supplemental latch being provided to restrain said pawls when they are released from said triggers, and means controlled by said carriage to withdraw said supplemental latch at a predetermined point in the travel of the carriage, said carriage being provided with an adjustable cam and a tappet mounted in the path of the cam to be operated thereby and release said supplemental latch and cause said latch to release said pawls, each pawl being releasable by its key and by the carriage; said pawls having notches which are normally occupied by said supplemental latch.

8. In a combined typewriting and computing machine, the combination with a carriage, numeral-type-keys, indexing mechanism operated thereby, and a set of registers, of a system of alphabet-type-key trains, and register-selecting means operable selectively by a group of said alphabet-type-key trains in co-operation with said carriage, and including a compact set of connections extending from said group of type-key trains to operate register-selecting devices selectively, there being a register-selecting device connected to each of said group of alphabet-type-key trains, and said carriage having means to determine the point where the keys in said group may make the selections.

9. In a combined typewriting and computing machine, the combination of a carriage, numeral-type-keys, indexing mechanism operated thereby, a set of registers having spring-shifted controllers, double-locked pawls to restrain the controllers from being shifted, a universal latch normally locking said pawls, said carriage having means effective during the advance of the carriage, to release said universal latch, spring-pressed triggers being provided for also locking said pawls, an alphabetical set of type-keys including register-selecting keys having means to withdraw said triggers to permit the register-controllers to operate, means brought into operation by the return of the carriage to begin a new line, for restoring to normal positions the set register-selecting mechanism including the pawls, the triggers being returned by their springs when the pawls are restored by means of said carriage, each pawl, at the restoring operation, having means, as it is being raised, to swing said universal latch to pawl-releasing position, and said universal latch having a spring to snap it into normal position in notches provided in said pawls, each pawl having one notch that is normally engaged by the universal latch, and another notch that is engaged by said universal latch after the pawl has been released by its individual trigger, the last-mentioned notch having a cam that forces the latch out when the pawl is lifted at the restoring operation.

10. In a combined typewriting and computing machine, the combination with a carriage, numeral-type-keys, indexing mechanism operated thereby, and a set of three or more registers, of a plurality of proof-type keys, and a selector-mechanism common to said proof-type keys and including means to enable one proof-type key to co-operate with said carriage to select registers for operation, said means controlled by another proof-type key to co-operate with said carriage for making a different selection of registers for operation, and said means enabling a third proof-type key to co-operate with said carriage to make still another selection of registers for operation, the same register being included in different selections.

11. In a combined typewriting and computing machine, the combination with a carriage, numeral-type-keys, indexing mechanism operated thereby, and a set of registers, of a system of alphabet-type-keys, and register-selecting means including devices controllable selectively by certain of said alphabet-type-keys in co-operation with a control element that is adjustable along said carriage.

12. In a combined typewriting and computing machine, the combination with a carriage, numeral-type-keys, indexing mechanism operated thereby, and a set of registers, of an alphabetical system of keys including a plurality of proof-type keys, and a selector-mechanism common to said proof-type keys, and having means to enable one proof-type key to co-operate with said carriage to select the registers in a certain combination from a set of three or more registers, said selector-mechanism also having means controlled by another proof-type key for co-operating with said carriage to select a different combination of registers for operation from said set, and said selector-mechanism also having means for enabling the third proof-type key to co-operate with said carriage to select still another combination of registers for operation from said set, each combination including a register from one of the other combinations.

HENRY L. PITMAN.